(12) United States Patent
Sheng et al.

(10) Patent No.: US 6,512,602 B1
(45) Date of Patent: Jan. 28, 2003

(54) GUIDE FOR A PAPER FEEDER

(75) Inventors: Thomas Sheng, Hsin-Chu (TW); Shein-Chi Lin, Hsin-Chu (TW)

(73) Assignee: Avision, Inc., Hsin-Chu (TW)

( * ) Notice: Subject to any disclaimer, the term of this patent is extended or adjusted under 35 U.S.C. 154(b) by 0 days.

(21) Appl. No.: 09/366,271

(22) Filed: Aug. 2, 1999

(30) Foreign Application Priority Data

Apr. 1, 1999 (TW) ........................................ 88105350 A

(51) Int. Cl.$^7$ .............................. H04N 1/04; B65H 5/22
(52) U.S. Cl. ...................................... 358/498; 271/3.14
(58) Field of Search ........................... 358/498; 271/3.14

(56) References Cited

U.S. PATENT DOCUMENTS

| 4,972,235 A | | 11/1990 | Iwamoto et al. | |
| 5,379,095 A | * | 1/1995 | Oishi | 358/497 |
| 5,610,731 A | | 3/1997 | Itoh | |

FOREIGN PATENT DOCUMENTS

JP    410186535 A   *   7/1998

* cited by examiner

Primary Examiner—Edward Coles
Assistant Examiner—Houshang Safaipour
(74) Attorney, Agent, or Firm—H. C. Lin

(57) ABSTRACT

An automatic paper feeder uses a paper guide with two separate lower blades for feeding the paper past a scan window. The separate blades provide smooth passage of the paper over the scan window and avoiding rubbing the scan window surface. When the paper feeding mechanism is used both for automatic paper feeding scanning and for flat-fed scanning, the image sensor position is changed for the two applications, because the former scan window lies over the larger scan window for flat bed scanning and the elevations of the scanned papers for the two situations are different. The vertical position of the image sensor can be changed to maintain equal distance between the scan surface and the image sensor.

3 Claims, 7 Drawing Sheets

GUIDE FOR A PAPER FEEDER

BACKGROUND OF THE INVENTION (1) Field of the Invention

This invention relates to paper feeders for facsimile machine, printers, scanner, etc., in particular to a paper guide for automatic paper feeders.

(2) Description of the Related Art

Traditional automatic paper feeder for a scanner is shown in FIG. 1. A sheet of paper P to be scanned is fed from the left side through a continuous paper guide, having an upper surface 11U, a lower surface with two supporting blades 11L and 11R and a resilient transparent thin film auxiliary scan window 10. The scanned light beam 13 is reflected from the paper to an image sensor 12. The scanned paper then recoils out of the lower right-hand blade 11R of the guide. Below the guide section 99 houses the main frame of the scanner 88, which has a larger transparent scan window 14 used for flat-bed scanning. The first scanning section F provides enough area for the automatic paper feed scanning function. The second scanning section S provides adequate scanning area for flat-bed scanning. Papers are fed intermittently from the left-hand side through the guide blade 11L, resilient film 10 and guide blade 11R automatically.

In such a traditional guide section, the transparent film 10 is constantly being rubbed during scanning operation. After long periods of time, the transparent film becomes blurred due to constant rubbing and the quality of the image deteriorates. Then the film 10 must be replaced. At the same time, since the left-hand guide blade 11L, the film 10 and the right guide blade 11R form a unitary structure which is inaccessible, the dirt residing on the film 10 cannot be wiped off easily.

BRIEF SUMMARY OF THE INVENTION

An object of this invention is to provide a guide for an automatic paper feeder which provides smooth passage of the paper being scanned. Another object of this invention is to provide a paper guide which can easily be cleaned.

These objects are achieved by using separate lower blades for the paper guide, which are separated from the scan window. At the same time the scan window is made of durable glass.

When the scanner is used for both flat-bed scanning and automatic paper feed scanning, the image sensor position should be changed to accommodate for the difference in distance from the image sensor from the scanned paper. Due to the extra scan window used for the automatic paper feeding mechanism, the paper is scanned at a plane higher than that for the flat-bed window. If the extra scan window is thick, provision is made to move the image sensor up so that the light beam reflected from scanned paper has equal length for both the automatic paper feed scanning and the flat-bed scanning. When the extra scan is very thin, it may not be necessary to change the elevation of the image sensor.

DETAILED DESCRIPTION OF THE INVENTION

Figure 1:
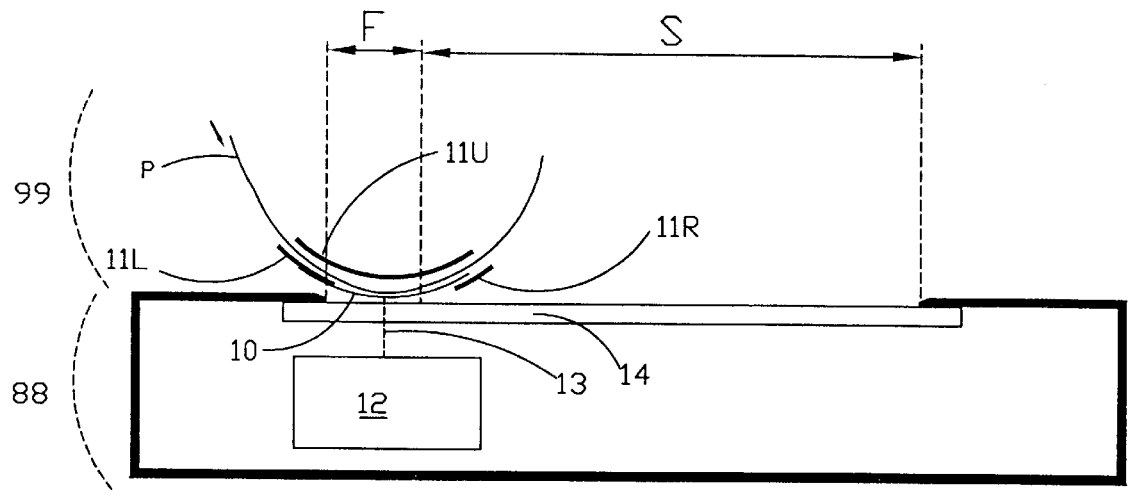
FIG. 1 shows a prior art automatic feed paper guide for a scanner.
Figure 2A:
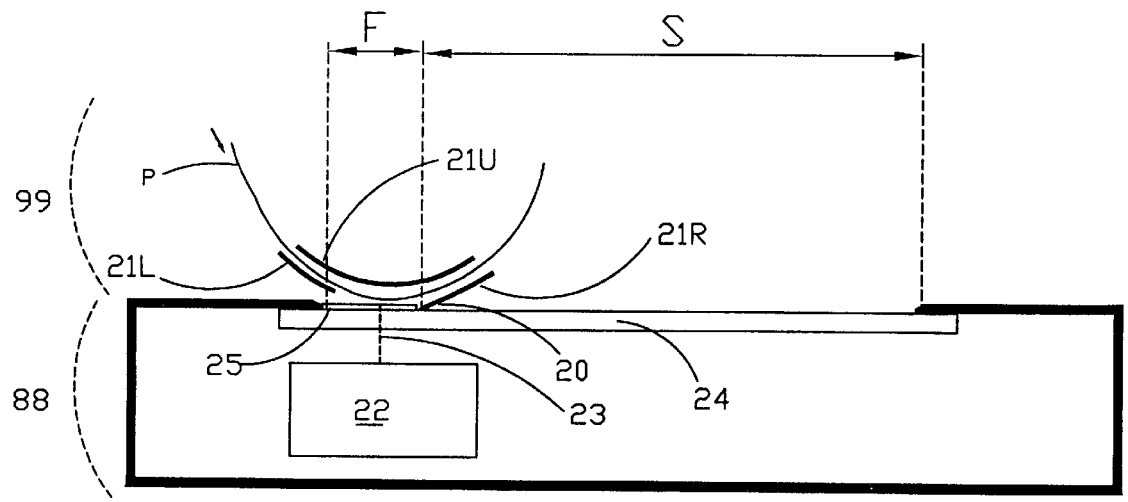
FIG. 2A shows a paper guide structure based on the present invention with a stepped trailing left-hand lower blade.

FIG. 2A shows the paper guide of the present invention. Section 88 is the main housing of the scanner, which houses a flat-bed window 24 and an image sensor 22 for sensing the reflected light beam of the scanned paper. The scanning section F or Section 99 is the paper guide section for automatically feeding paper to the scanner to be scanned. The effective scanning area F is defined by another scan window 25, made with durable transparent material. A piece of paper P is fed from the left-hand side through a paper guide, having an upper surface 21U and a lower surface with a left-hand blade 21L and right-hand blade 21R inclining on two sides of the scan window 25. The feature of this invention is that the lower edge of the blade 21L forms a step with the scan window and the leading right-hand blade 21R makes a coplanar connection with the scan window 25. In this manner, there is smooth passage of the paper.

Figure 2B:
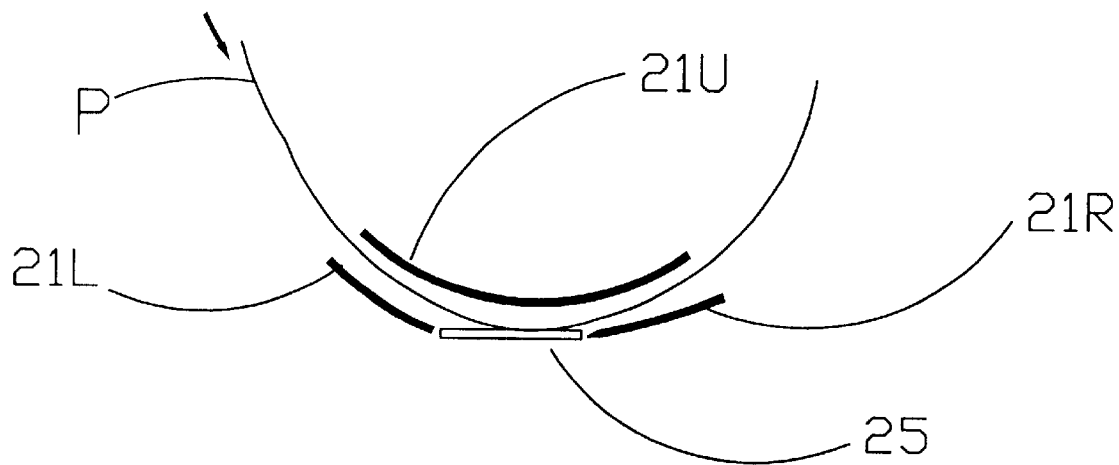
FIG. 2B shows a piece of paper in contact with a durable transparent scan window with continuous lower blades.

FIG. 2B shows another embodiment of the present invention. In this guide structure, both the left-hand trailing blade 21L and the right-hand leading blade 21R form coplanar connections with the scan window 25 at their ends.

Figure 2C:
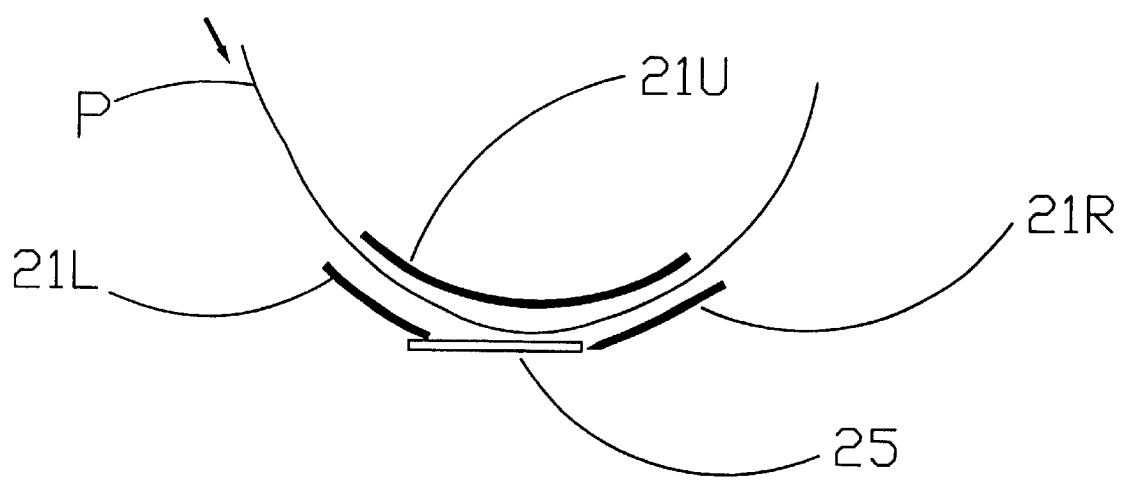
FIG. 2C shows a paper guide with lower trailing left-hand blades resting on the scan window.

FIG. 2C shows a third embodiment of the paper guide structure. The right-hand leading blade 21R is joint with the scan window 25 as in FIG. 2B, but the end of left-hand trailing blade 21L lies over the scan window 25 to form a step connection with the scan window 25.

Figure 2D:
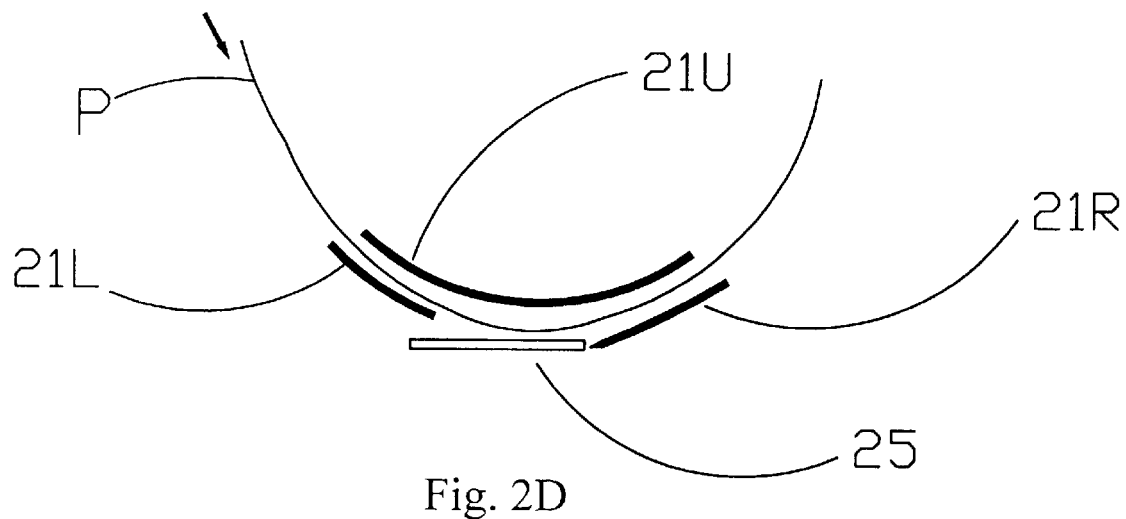
FIG. 2D shows a paper guide where the trailing left-hand lower guide blade forms a step with the transparent scan window.

FIG. 2D shows a modification of FIG. 2C. The end of the left-hand trailing blade 21L is lifted over the scan window 25 to form a step connection above the scan window instead of resting on the scan window.

Figure 2E:
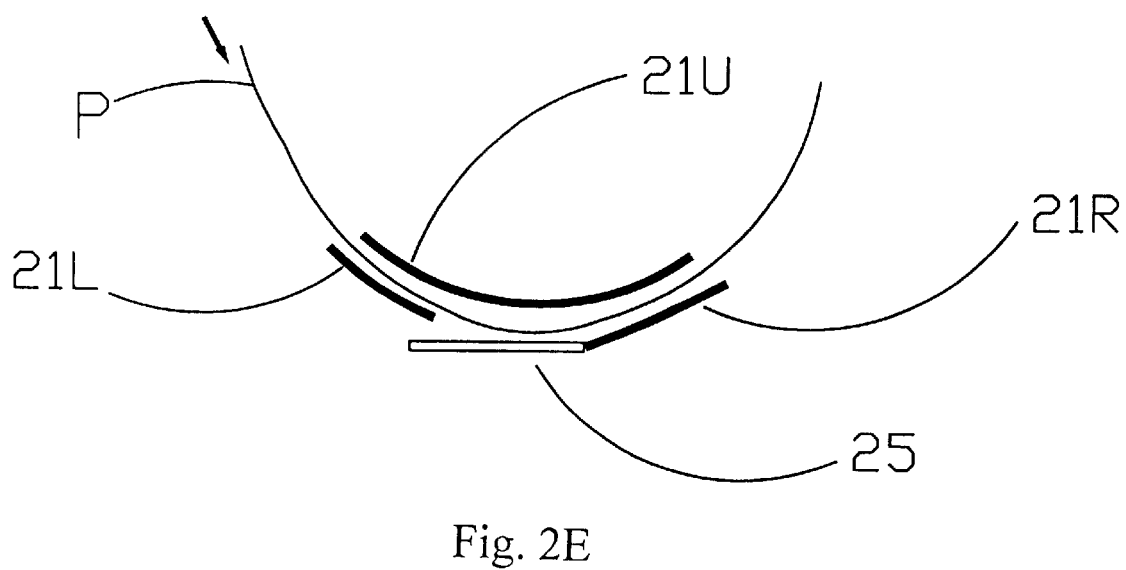
FIG. 2E shows a paper guide where the leading right-hand lower blade is continuous with the transparent scan window.

FIG. 2E shows the left-hand blade 21L forms a step with the scan window 25, but the right-hand leading blade 21R forms a coplanar connection with the scan window 25.

Figure 2F:
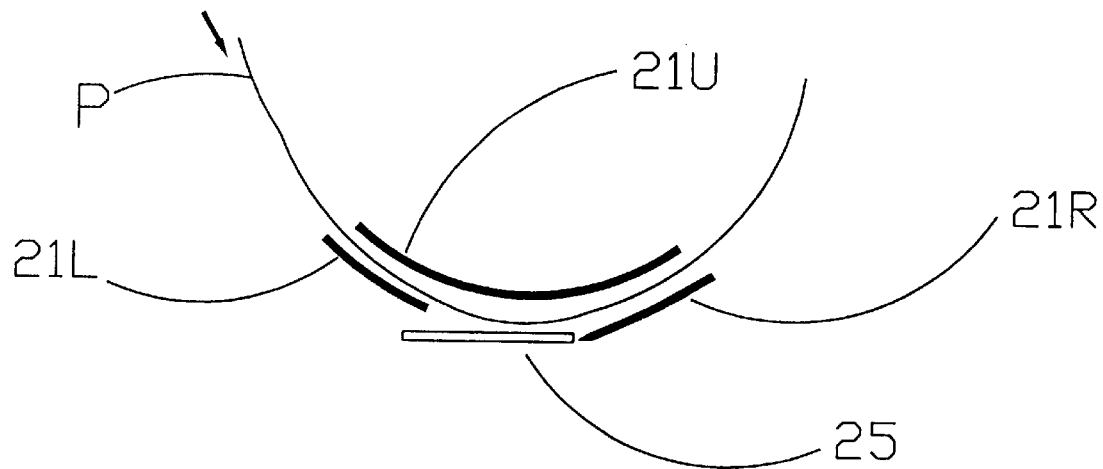
FIG. 2F shows a paper guide with the trailing left-hand lower blade forming a step with the scan window.

FIG. 2F shows a fifth embodiment of the present invention. The structure is similar to the structure shown in FIG. 2E, except that the lower right-hand leading blade 21R forms a step connection with the scan window 25.

Figure 2G:
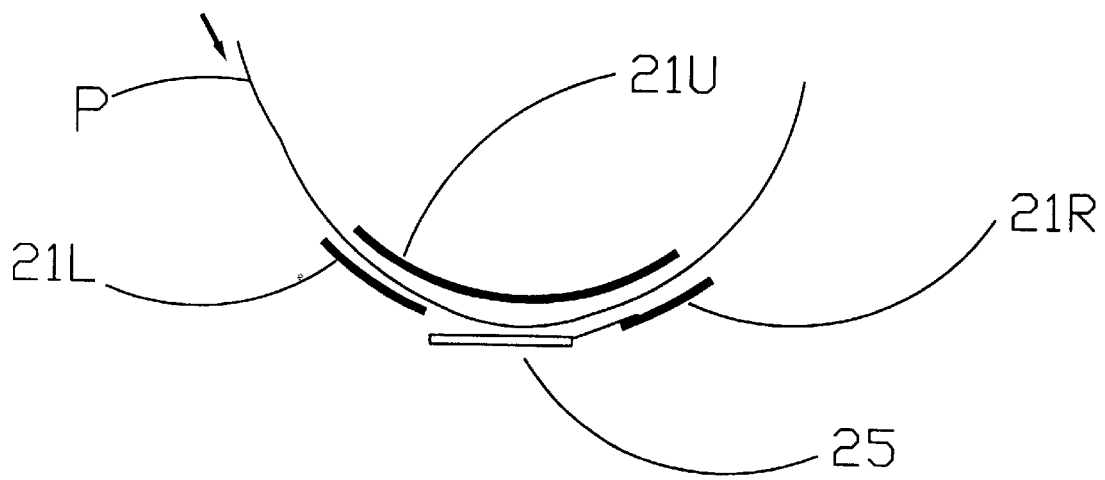
FIG. 2G shows a paper guide with the leading right-hand lower blade linked with the auxiliary scan window by a coplanar flexible film.

FIG. 2G shows a sixth embodiment of the present invention. The guide structure is similar to that of FIG. 2F except that the lower right-hand leading blade 21R is separated from the scan window 25 by a coplanar flexible film 23.

Figure 2H:
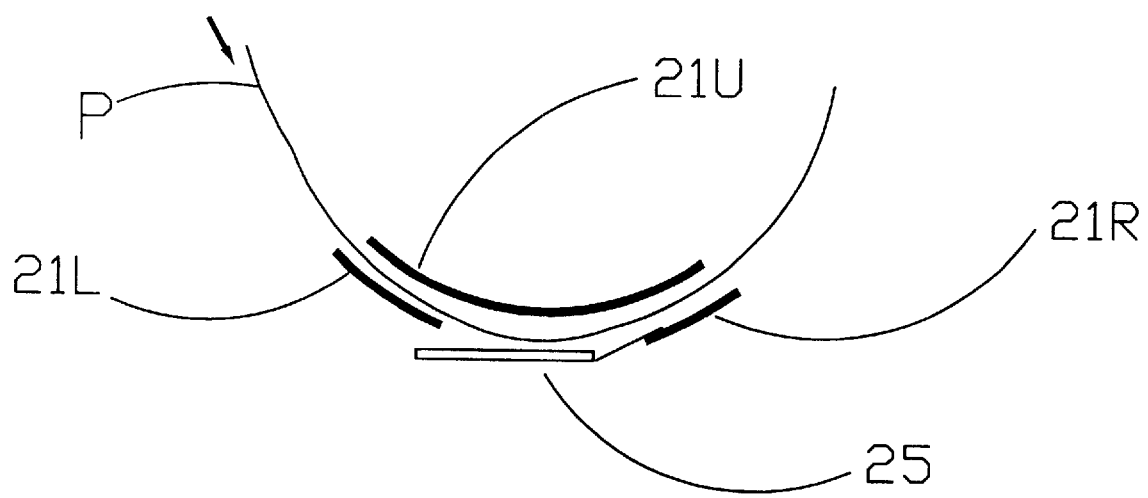
FIG. 2H shows a paper guide with the leading right-hand lower blade linked with the auxiliary scan window by a stepped flexible film.

FIG. 2H shows a seventh embodiment of the present invention. The guide structure is similar to that of FIG. 2G except that the right-hand leading blade 21R forms a step with the scan window 25.

In FIGS. 2A–2H, all the coplanar connections and step connections are for smooth passage of the paper to be scanned.

Figure 3A:
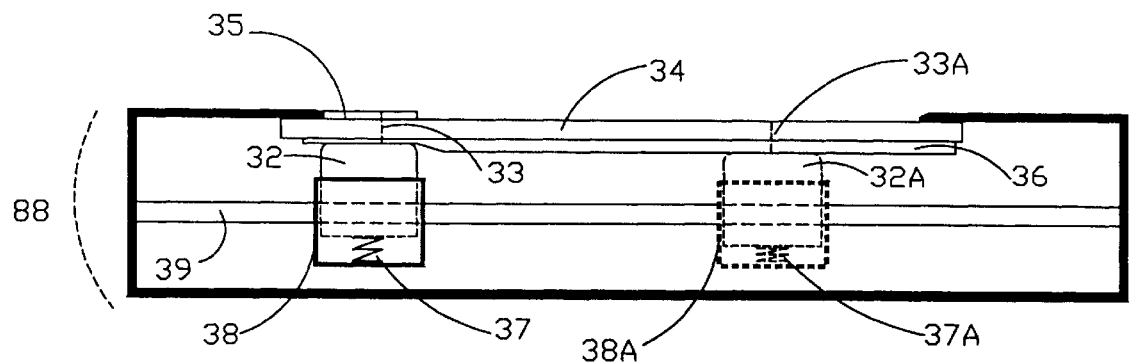
FIG. 3A shows the side view of a guide rail design for a scanner suitable for both flat-bed scanning and for automatic paper feed scanning.
Figure 3B:
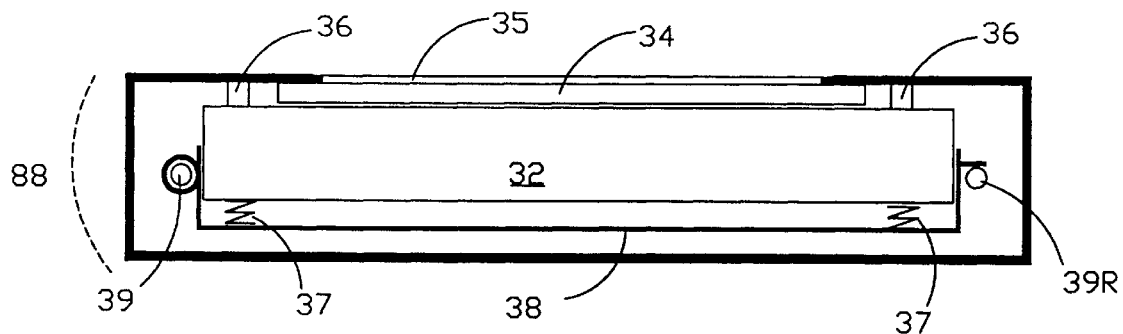
FIG. 3B shows another view of FIG. 3A.

FIG. 3A shows a stepped image sensor 32 riding a rail track 39, where the vertical positions of the image sensor changes with the thickness of the scan window. For automatic paper feed, the scan window 35 is located at the upper left corner of the flat-bed window 34 which lies over the main body 88 of the scanner. For automatic paper feed scanning, the light beam 33 is reflected from the scanned paper to the image sensor 32. The image sensor is housed in a carrier 38 and is pushed toward the scan window 35 by a spring 37 at the bottom of the image sensor 32. When the scanner functions as a flat-bed scanner, the scanned paper lies flat over the flat-bed window 34 without being scanned through the auxiliary scan window 35. Thus the reflected light beam 33A for the flat-bed scanning is lower than the reflected light beam 33 from the scan window 35. To equalize the lengths of the two light beams 33 and 33A, two upper auxiliary step rails 36 are attached to the two sides of the flat-bed window 34 as shown in the end view FIG. 3B. While scanning through the scan window 35 is sensed by the image sensor 32 riding at the left-hand side of the rail 39, scanning for the flat-bed side is accomplished with the carrier 38A sliding over the step rail 39 to the right-had side dotted line position. In the 38A position of the image sensor 32A, the image sensor 32A is forced away from the flat-bed window 34 and the scanned light beam 33A is moved downward relative to the light beam 33. However the lengths of light beam 33A and that of 33 are made the same with the insertion of the auxiliary step rails 36. In either case, the scanned image is focused onto the image sensor.

Figure 4A:
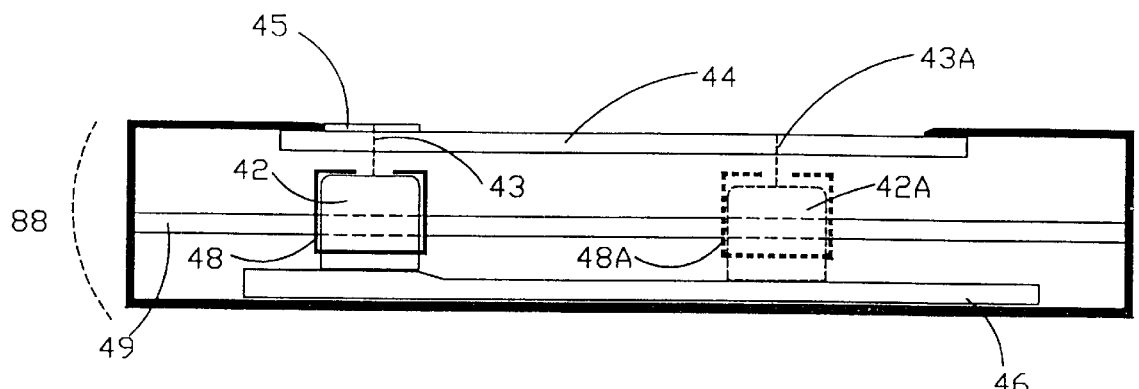
FIG. 4A shows a side view of another guide rail design for the dual-use scanner.
Figure 4B:
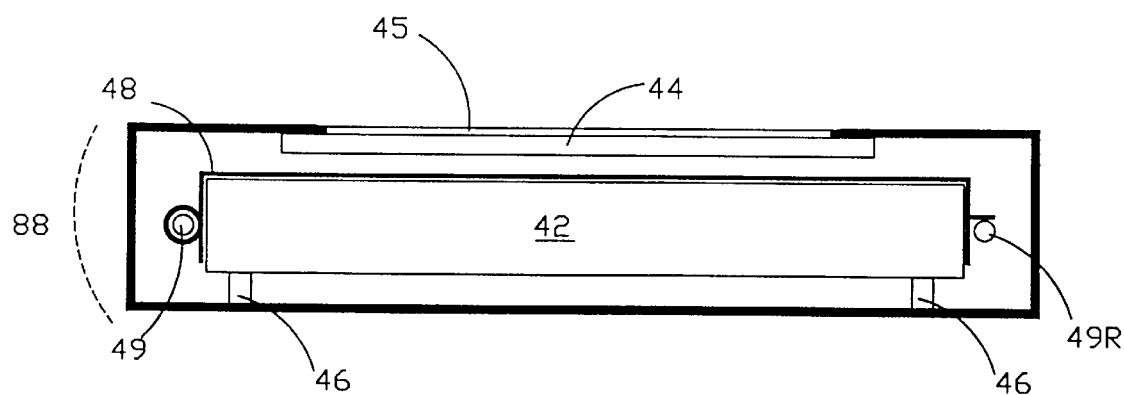
FIG. 4B shows another view of FIG. 4A.

FIG. 4A shows another design of the dual-position image sensor. Two step pedestals 46 are placed under the image sensor as shown in the end view in FIG. 4B. The left-hand side of the pedestals 46 in FIG. 4A is taller than the right-hand side. When the carrier 48 of the image sensor 42 riding on the rail 49 is in the left hand position to sense the scanned information through the auxiliary scan window 45 for automatic paper feed scanning, the carrier 48 for the image sensor 42 is riding over the taller section of the pedestal 46. When the image sensor 42A is sensing the flat-bed section of the scanner, the carrier 48A of the image sensor 42A is slid to the lower section of the pedestal 46. By making the pedestal step equal to the thickness of the auxiliary scan window 45, the reflected light beam 43 in the left-hand position of the image sensor 42 is equal in length to the reflected light beam 43A in the right-hand position of the image sensor 42A. Then the scanned images in both positions are in focus.

In the forgoing description, the durable auxiliary window can be made of glass. The image sensor can be a charge coupled device or a contact image sensor.

The auxiliary scan windows 25, 35 and 45 can be combined with the paper guide mechanism 99 to form a unitary structure. The auxiliary scan window can also be combined with the main body 88 of the scanner.

While the preferred embodiments of the invention have been described in connection with a scanner, it will be apparent to those skilled in the art that various modifications may be made in the embodiments for use in a printer, a facsimile machine, etc. without departing from the spirit of the present invention. Such modifications are all within the scope of this invention.

What is claimed is:

1. A scanner with dual capability of automatic paper feeding scanning and flat-bed scanning, comprising:

a scanner frame, a first scan window mounted on said scanner frame for said flat-bed scanning;

a second scan window placed over an end portion of said first window for said automatic paper feeding scanning;

an image sensor capable of sensing one of scanned information from said automatic paper feeding scanning and from said flat-bed scanning; and means to change vertical position of the image sensor so that the distance between the image sensor and the surface of the first scan window when flat-bed scanning is performed, and the distance between the image sensor and the surface of the second scan window are the same, wherein said means to change vertical position is to ride the image sensor on two step rails to different positions under the first scan window.

2. A scanner as described in claim 1, wherein said step rails are placed under the top surface of said frame.

3. A scanner as described in claim 1, wherein said step rails are placed at the bottom of said frame.

* * * * *